UNITED STATES PATENT OFFICE.

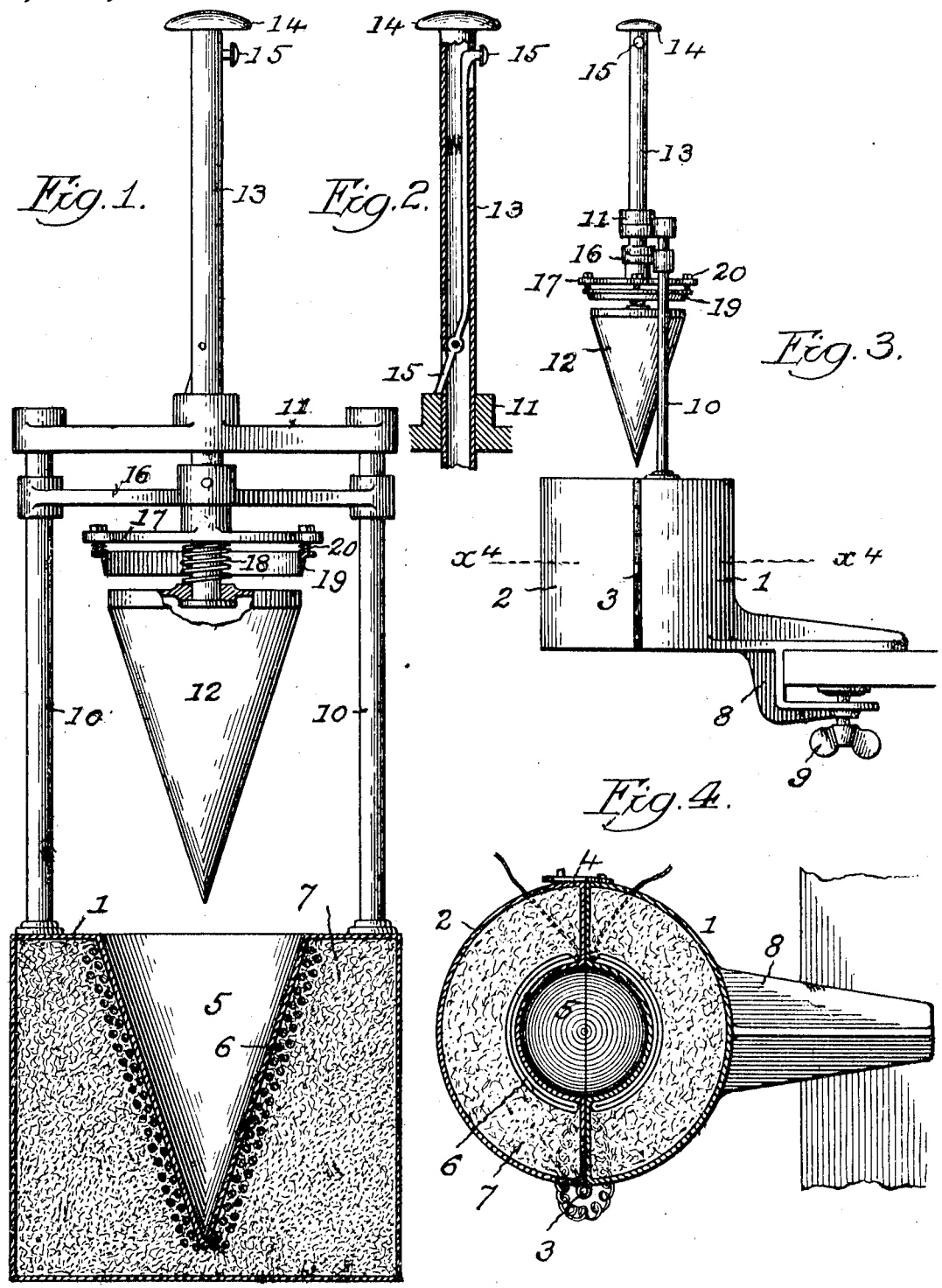

RICCARDO MIGLIETTA, OF LAURIUM, MICHIGAN.

ICE-CREAM-CONE APPARATUS.

1,314,602.   Specification of Letters Patent.   Patented Sept. 2, 1919.

Application filed March 21, 1919. Serial No. 284,090.

*To all whom it may concern:*

Be it known that I, RICCARDO MIGLIETTA, a subject of the King of Italy, and a resident of Laurium, in the county of Houghton and State of Michigan, have invented certain new and useful Improvements in Ice-Cream-Cone Apparatus, of which the following is a specification.

This invention relates to an electrically heated appliance for molding and baking individual edible ice-cream cones, and has for its object:—

To provide a simple and efficient structural formation and association of parts, whereby ice-cream cones and the like are rapidly molded in an effective and uniform manner, the surplus material removed, the article properly baked and subsequently removed in a ready and safe manner, all as will hereinafter more fully appear.

In the accompanying drawing:—

Figure 1, is a sectional elevation illustrating a single cone type of apparatus, embodying the present invention.

Fig. 2, is a detail vertical section of the operating stem, etc., of the apparatus.

Fig. 3, is a side elevation illustrating the apparatus in place on a table or bench top.

Fig. 4, is a horizontal section on line $x^4$—$x^4$, Fig. 3.

Like reference numerals indicate like parts in the several views.

As represented in the drawing the combined molding and baking member of the apparatus is formed by a stationary mold half or section 1 and a like movable mold half or section 2, with their line of separation in a vertical plane and pivotally connected together by hinges 3 at one side, and attached together at the other side by a latch mechanism 4 as shown more particularly in Figs. 3 and 4.

5 designates the mold cavity of the apparatus, formed equally in the two mold halves 1 and 2 and having the usual conical form corresponding to that of the ice-cream cone to be produced, with the surface of the mold cavity grooved or otherwise formed to impart the desired ornamental configuration to the outer surface of the ice-cream cone.

In the present improvement each mold half or section 1, 2, is of a shell form adapted to contain an electric resistance or heating element 6 in close adjacent relation to that portion of the wall formation of the shell which incloses the mold cavity 5 aforesaid. The electric heating element 6 will be of any ordinary and suitable formation and connected in any usual manner with a source of electro-motive force, and it is preferable to fill the outer portions of the chambers of the aforesaid shells with non-combustible heat insulating material 7, such as asbestos, as shown in Figs. 1 and 3.

8 designates an attaching arm or bracket fixedly attached to the stationary mold section 1, and provided with a clamping screw 9 by which the apparatus may be secured to the top board of a table or bench as shown in Fig. 3.

10 designates guide rails extending vertically from the aforesaid stationary mold section 1 and connected together at top by a cross head 11.

12 designates the mold core of the present structure having a conical form corresponding to that of the mold cavity 5 and sufficiently smaller than said mold cavity so that when the mold core is moved fully into the mold cavity an annular conical space will be left corresponding with the thickness of the wall of the ice-cream cone to be produced.

13 designates a guide stem secured centrally to the upper end of the mold core 12, and passing through and guided in the cross head 11 aforesaid, at its upper end said stem 13 is provided with an operating handle 14, and near such upper end with a manually actuated spring catch 15 by which the stem 13 and mold core 12 are secured in their elevated position illustrated in Fig. 1.

16 designates a transverse guide frame secured to the guide stem 13 and having sliding engagement with the guide rails 10 for additionally guiding said stem and the mold core in their vertical movements.

17 designates a carrying frame revolubly and slidingly mounted on the guide stem 13, beneath the aforesaid guide frame 16, and normally held in a raised condition by a spring 18 arranged beneath the frame 17 as shown in Fig. 1.

19 designates an annular knife or cutter, yieldingly connected by associated bolts and springs 20 to the aforesaid carrying frame 17 and depending therefrom as shown. Said knife or cutter 19 is of a diameter slightly larger than the diameter of the upper end of the mold core 12, so that when said mold core is forced into the mold cavity 5 said cutter and its carrying frame 17 may be further depressed by hand and rotated to sever the excess dough which is usually forced above the mold cavity 5 in the initial molding operation of the apparatus.

In the practical operation of the apparatus, after the mold sections 1 and 2 are closed together and properly latched, a measured quantity of ice-cream cone forming dough is dropped into the mold cavity 5. The holding latch 15 of the mold core 12 is then released, and said mold core 12 is pushed down to its full extent into the mold cavity 5 and in such downward movement of the core the dough in said mold cavity is forced upward between the surfaces of the mold core and mold cavity in the form of a thin web corresponding in thickness with that required in the wall of an ice-cream cone. The cutter 19 is then manipulated in the manner heretofore described to sever the surplus dough at the top of the mold, after which the mold core 12 is returned to and latched in its normal elevated condition. The electric current is then switched onto the electric heating element 6, to effect the proper baking of the web of dough filling the mold cavity 5, after which the mold sections 1 and 2 are opened and the formed ice-cream cone removed leaving the apparatus ready for a repetition of the above described cycle of operations.

Having thus fully described my said invention what I claim as new and desire to secure by Letters Patent, is:—

1. In an ice-cream cone apparatus, the combination of a plurality of mold sections hinged together and provided with a mold cavity on the line of division of said sections and with electric heating elements, a movable mold core fitting said mold cavity, means for guiding said core in its movements into and out of said mold cavity, and an annular cutter associated with the upper portion of the mold core and having independent rotation in relation to said core, substantially as set forth.

2. In an ice-cream cone apparatus, the combination of a stationary mold section, a movable mold section hinged to said stationary section and provided with a latching means, said mold sections having a mold cavity formed on the line of division between said sections and each section provided with an electric heating element, vertical guides secured to the stationary mold section, a mold core mounted on said guides for movement into and out of the mold cavity, and an operating stem attached to said mold core, substantially as set forth.

3. In an ice-cream cone apparatus, the combination of a stationary mold section, a movable mold section hinged to said stationary section and provided with a latching means, said mold sections having a mold cavity formed on the line of division between said sections and each section provided with an electric heating element, vertical guides secured to the stationary mold section, a mold core mounted on said guides for movement into and out of the mold cavity, an operating stem attached to said mold core, and an annular cutter mounted on said stem and having independent sliding and rotary movement thereon, substantially as set forth.

4. In an ice-cream cone apparatus, the combination of a stationary mold section, a movable mold section hinged to said stationary section and provided with a latching means, said mold sections having a mold cavity formed on the line of division between said sections and each section provided with an electric heating element, vertical guides secured to the stationary mold section, a mold core mounted on said guides for movement into and out of the mold cavity, an operating stem attached to said mold core, and latching means for holding said core in one position substantially as set forth.

5. In an ice-cream cone apparatus, the combination of a stationary mold section, a movable mold section hinged to said stationary section and provided with a latching means, said mold sections having a mold cavity formed on the line of division between said sections and each section provided with an electric heating element, vertical guides secured to the stationary mold section, a mold core mounted on said guides for movement into and out of the mold cavity, an operating stem attached to said mold core, an annular cutter mounted on said stem and having independent sliding and rotary movement thereon, and a spring tending to move said cutter in one direction, substantially as set forth.

6. In an ice-cream cone apparatus, the combination of a stationary mold section, a movable mold section hinged to said stationary section and provided with a latching means, said mold sections having a mold cavity formed on the line of division between said sections and each section provided with an electric heating element, vertical guides secured to the stationary mold section, a mold core mounted on said guides for movement into and out of the mold cavity, an operating stem attached to said mold core, a carrying head rotatively and slidingly mounted on said stem, and an annular cutter yieldingly attached to said carrying head, substantially as set forth.

7. In an ice-cream cone apparatus, the combination of a stationary mold section, a movable mold section hinged to said stationary section and provided with a latching means, said mold sections having a mold cavity formed on the line of division between said sections and each section provided with an electric heating element, vertical guides secured to the stationary mold section, a mold core mounted on said guides for movement into and out of the mold cavity, an operating stem attached to said mold core, a carrying head rotatively and slidingly mounted on said stem, a spring tending to move said carrying head in one direction, and an annular cutter yieldingly attached to said carrying head, substantially as set forth.

Signed at Chicago, Illinois, this 18th day of March, A. D. 1919.

RICCARDO MIGLIETTA.